United States Patent [19]

Schleith et al.

[11] Patent Number: 5,340,877

[45] Date of Patent: Aug. 23, 1994

[54] POLYOXYMETHYLENE COMPOSITION, AND ITS USE

[75] Inventors: Oskar Schleith, Hofheim am Taunus; Hans-Dieter Sabel, Königstein/Taunus, both of Fed. Rep. of Germany

[73] Assignee: Hoechst Aktiengesellschaft, Frankfurt, Fed. Rep. of Germany

[21] Appl. No.: 900,905

[22] Filed: Jun. 18, 1992

[30] Foreign Application Priority Data

Jun. 21, 1991 [DE] Fed. Rep. of Germany ....... 4120490

[51] Int. Cl.$^5$ .................. C08L 59/02; C08L 33/02
[52] U.S. Cl. ................... 525/154; 525/451; 524/493; 524/494
[58] Field of Search ............... 525/154, 451; 524/493, 524/494

[56] References Cited

U.S. PATENT DOCUMENTS

| | | | |
|---|---|---|---|
| 3,658,749 | 4/1972 | Gordon | 260/37 |
| 4,975,478 | 12/1990 | Okuda | 524/86 |
| 5,047,471 | 9/1991 | Burg et al. | 525/66 |
| 5,079,282 | 1/1992 | Okuda | 524/91 |
| 5,118,734 | 6/1992 | Katsumata | 524/91 |
| 5,141,993 | 8/1992 | Siol et al. | 525/154 |
| 5,191,011 | 3/1993 | Tajima et al. | 525/154 |

FOREIGN PATENT DOCUMENTS

| | | |
|---|---|---|
| 0300573 | 1/1989 | European Pat. Off. . |
| 0329028 | 8/1989 | European Pat. Off. . |
| 0342000 | 11/1989 | European Pat. Off. . |
| 0356167 | 2/1990 | European Pat. Off. . |
| 2129522 | 12/1971 | Fed. Rep. of Germany . |
| 1170641 | 5/1989 | Japan . |

*Primary Examiner*—James J. Seidleck
*Assistant Examiner*—W. R. H. Clark
*Attorney, Agent, or Firm*—Connolly & Hutz

[57] ABSTRACT

It has been found that moldings produced from polyoxymethylene have reduced gloss if an acrylic (co)polymer is incorporated into the polyoxymethylene. The polyoxymethylene modified according to the invention gives moldings having a streak-free, uniformly matt surface which generally retain the physical properties and also the inherent color of the base material.

12 Claims, No Drawings

POLYOXYMETHYLENE COMPOSITION, AND ITS USE

The invention relates to a modified polyoxymethylene with which moldings having reduced surface gloss or a matt surface can be produced.

Polyoxymethylene (POM) is a high-quality engineering material and is employed in many areas of industry. In order to extend the applications, customized grades have been developed by adding additives which improve certain physical properties. For example, materials which ensure reduced surface gloss on moldings such as panels, covers, switches, levers, etc., are required in the interior of automobiles for aesthetic reasons, but also for safety reasons.

This effect has hitherto been achieved in the polyoxymethylenes having a matt surface which have been disclosed hitherto by addition of inorganic fillers. However, this has the disadvantage that other properties, especially mechanical properties, in particular the toughness, are adversely affected.

Also known are polyoxymethylenes having a matt surface in which this effect is achieved by addition of polyurethanes. In this case, however, relatively large amounts of these additives are required. Although this does not, as in the case of inorganic fillers, result in a reduction in toughness, other POM-typical properties, for example surface hardness and rigidity, are, however, impaired.

Unmodified polyoxymethylene, on injection molding, gives parts of high surface gloss. This may well be desired in numerous cases (visible parts), and efforts have hitherto been predominantly directed at producing high gloss by appropriate processing.

A reduction in the degree of gloss on the surface is achieved by reducing the surface smoothness and thus by a change in light reflection. Matting additives, for example inorganic fillers, such as chalk, talc, mica, glass beads and glass fibers, or organic, high-molecular-weight substances, such as thermoplastic polyurethanes, work on this principle. However, these substances alone do not give an adequate matting effect or they change other physical properties excessively.

Matting effects can also be achieved using the sodium aluminum silicate used in the plastics industry as an antiblocking agent and using silicon dioxide. However, polyoxymethylene incorporating these substances gives very rough, bumpy surfaces on injection molding.

Furthermore, although, for example, the addition of a specific aluminum silicate fiber satisfies the requirements for adequate gloss reduction and the retention of the mechanical properties of polyacetal compositions or the articles produced therefrom (EP-A-0 342 000), they exhibit, however, flow marks and whirls on the surface which are in many cases undesired. In addition, the fibers have occupational-physiological disadvantages and therefore cause problems in the production of the raw materials.

It was therefore desirable to provide a POM having a matt surface and flawless surface quality without the above disadvantages; in particular, the POM-typical properties should be essentially retained.

The object has been achieved by producing a matt surface by addition of certain acrylate (co)polymers to POM without impairing the hardness, rigidity and toughness of the acetal polymer, which was not predictable.

The invention relates to a polyoxymethylene composition comprising A) polyoxymethylene and B) an acrylic (co)polymer.

The term polyoxymethylene is characterized by recurring oxymethylene groups and includes all polymers in which more than 50% of the recurring units are —$CH_2O$—, such as polyoxymethylene homopolymers, copolymers, terpolymers, etc. They generally have a melt flow index (MFI 190/2.16) of from 2 to 50.

Suitable acrylic polymers are polymethyl, polyethyl and polybutyl (meth)acrylates and mixtures thereof or copolymers thereof, in particular with styrene as the comonomer. Preference is given to polymethacrylate, in particular polymethyl methacrylate, and the copolymer of methyl methacrylate and styrene.

The acrylic (co)polymers are generally prepared by the bulk process and are in the form of ground particles; however, the "beads" obtained by the suspension process are also suitable.

In general, the acrylic (co)polymer is added to the polyoxymethylene in amounts of from 0.5 to 10% by weight - based on the total mixture. It is preferred to employ from 1 to 5 per cent by weight. The addition of less than 0.5% by weight of the acrylic (co)polymer to the polyoxymethylene does not generally cause an adequate reduction in gloss, while addition of more than 6% by weight generally only results in a reduction in gloss if small particle sizes are employed.

The particle size of the polymers also affects the degree of matting. Very small particles, for example <50 μm, generally result in a decrease in the matting effect, which is no longer acceptable for particles of less than 20 μm. Although the degree of matting is good for particle sizes greater than 600 μm, for example 800 μm, the surface is, on the other hand, rough. Preference is therefore given to moderate particle sizes of from 20 to 600 μm.

It has furthermore been found that small particle sizes—and this is contrary to the matting effect—make a significant contribution to improving the surface quality of injection moldings. For this reason, moderate particle sizes of from 20 to 300 μm are particularly preferred for avoiding rough surfaces on injection moldings.

Surprisingly, it has been found that the addition of silicon dioxide, for example in concentrations of from 0.1 to 2% by weight, preferably in concentrations of from 0.5 to 1 per cent by weight, improves the uniformity of the injection-molding surface and the degree of matting. In addition, the amount of acrylate (co)polymer employed can be reduced.

The mean agglomerate size of the silicon dioxides is from 3 to 15 μm, preferably from 3 to 5 μm. The freedom from streaks and the mechanical properties of the compositions according to the invention are retained.

Silicon dioxides alone in a proportion of less than 2% by weight in the POM cause hardly any matting effects, Higher concentrations cause rough injection-molding surfaces.

The form of the polyoxymethylene/acrylate (co)polymer composition can be produced by various methods, for example as granules by extrusion of the mixture or by later addition of the acrylic (co)polymer to the polyoxymethylene as a concentrate.

The composition may additionally contain small amounts of conventional additives, such as stabilizers, including formaldehyde scavengers, antioxidants, light stabilizers, lubricants, dyes, pigments and carbon black.

Other additives, for example various types of organic, high-molecular-weight substances or inorganic fillers, may also be incorporated in minor amounts into the polyoxymethylene as a mixture with the acrylic (co)-polymer or added later as a concentrate.

Specific examples of organic, high-molecular-weight substances are: polyurethanes, vinyl compounds and copolymers, such as ethylene-vinyl acetate copolymers, ethylene-alkyl acrylate copolymers, styrene-butadiene-acrylonitrile copolymers, styrene-acrylonitrile copolymers and methyl methacrylate-butadiene-styrene polymers.

It is also possible to add inorganic fillers in amounts which do not significantly affect the mechanical and physical properties of the compositions according to the invention, for example glass fibers, carbon fibers, glass beads, mica, talc and chalk. It is also possible to add antistatics or electroconductive agents, such as conductive blacks and other carbon blacks, in particular carbon blacks having coarse particles (about 90 $\mu$m).

EXAMPLES

The table shows, in addition to the compositions according to the invention (Examples 7, 8, 10–15), also compositions comprising polyoxymethylene with various known matting agents. The remaining examples, which were carried out using agents employed hitherto for POM, are comparative experiments.

The polyoxymethylene employed was a copolymer of trioxane and ethylene oxide having a melt flow index MFI 190/2.16 of 13 g/10 min. The black concentrate used was a mixture of an acetal copolymer of the same composition ( MFI 190/2.16=9 g/10 min) and Acetogen Black HV (manufacturer: Hoechst AG, Frankfurt a. Main, Germany). The polyurethane employed was an aliphatic polyester-urethane based on adipic acid and $C_2$–$C_6$-diols with hexamethylene diisocyanate.

Polyoxymethylene was mixed with the additives shown in the table, and the mixture was prepared in a ZSK 53 twin-screw extruder (Werner & Pleiderer, Stuttgart, Germany) at a material temperature of 200° C. and then granulated, The granules obtained were used to produce test specimens under constant conditions (material temperature 200° C., mold-wall temperature 90° C., flow-front speed 200 mm/s) on a KM 90/210 B injection-molding machine (Kraus-Maffei, Munich, Germany). The following properties of the test specimens were tested under standard conditions.

| | |
|---|---|
| Melt flow index MFI 190/2.16 | DIN 53735 |
| Yield stress | DIN 53455 |
| Elongation at yield stress | DIN 53455 |
| Elongation at break | DIN 53455 |
| Modulus of elasticity in bending | DIN 53457 |
| Ball-impression hardness | DIN 53456 |
| Izod notched impact strength | ISO 180/1A |
| Gloss | 60° Gardner |

The surface quality was assessed visually. The use amounts shown are parts by weight. The results are shown in the table.

"MFI 190/2" for the melt flow index always means "MFI 190/2.16".

| Examples | | 1C | 2C | 3C | 4C | 5C | 6C |
|---|---|---|---|---|---|---|---|
| Acetal copolymer MFI 190/2*) = 13 g/10 min | | 80 | 75 | 79.5 | 78 | 77 | 75 |
| Color concentrate | | | | | | | |
| 85 parts of acetal copolymer MFI190/2*) = 9 g/10 min 15 parts of Acetogen Black HV | | 20 | 20 | 20 | 20 | 20 | 20 |
| Sodium-aluminum silicate mean particle size 3.5 $\mu$m | | — | 5 | — | — | — | — |
| Silicon dioxide mean particle size 4 $\mu$m | | — | — | 0.5 | 2 | 3 | 5 |
| Properties | Unit | | | | | | |
| Melt flow index | | | | | | | |
| MFI 190/2 | g/10 min | 11.8 | 13.4 | — | — | — | 9.4 |
| Yield stress | N/mm$^2$ | 66 | 58 | — | — | — | 66 |
| Elongation at yield stress | % | 7 | 7 | — | — | — | 7 |
| Elongation at break | % | 12 | 12 | — | — | — | 8 |
| Modulus of elasticity in bending | N/mm$^2$ | 3100 | 3100 | — | — | — | 3200 |
| Ball-impression hardness | N/mm$^2$ | 155 | — | — | — | — | — |
| Izod notched impact strength | mJ/mm$^2$ | 4.5 | 4 | — | — | — | 4 |
| Gloss (60° Gardner) | — | 74 | 41 | 71 | 68 | 51 | 6 |
| Surface quality | — | smooth | large flow marks whirls | smooth | smooth | rough surface streaks | large flow marks whirls |

| Examples | 7 | 8 | 9C | 10 | 11 |
|---|---|---|---|---|---|
| Acetal copolymer MFI 190/2 = 13 g/10 min | 75 | 77 | 77 | 77 | 77 |
| Color concentrate | | | | | |
| 85 parts of acetal copolymer MFI190/2 = 9 g/10 min 15 parts of Acetogen Black HV | 20 | 20 | 20 | 20 | 20 |
| Methyl methacrylate-styrene copolymer Beads, mean particle size 200 $\mu$m | 5 | 3 | — | — | — |
| Polymethyl methacrylate Ground particles, mean particle size 800 $\mu$m | — | — | 3 | — | — |
| Polymethyl methacrylate | — | — | — | 3 | — |

-continued

| | | | | | | |
|---|---|---|---|---|---|---|
| Ground particles, mean particle size 150 μm | | | | | | |
| Polymethyl methacrylate Powder, mean particle size 50 μm | | — | — | — | — | 3 |
| Properties | Unit | | | | | |
| Melt flow index | | | | | | |
| MFI 190/2 | g/10 min | 11.5 | 11.5 | 10.8 | — | — |
| Yield stress | N/mm² | 64 | 63 | 64 | — | — |
| Elongation at yield stress | % | 7 | 7 | 7 | — | — |
| Elongation at break | % | 9 | 9 | 9 | — | — |
| Modulus of elasticity in bending | N/mm² | 3000 | 2950 | 3000 | — | — |
| Ball-impression hardness | N/mm² | 150 | 150 | — | — | — |
| Izod notched impact strength | mJ/mm² | 4 | 4 | 3.9 | — | — |
| Gloss (60° Gardner) | — | 49 | 60 | 42 | 44 | 64 |
| Surface quality | — | smooth | smooth | rough surface | smooth | smooth |

| Examples | | 12 | 13 | 14 | 15 |
|---|---|---|---|---|---|
| Acetal copolymer MFI 190/2 = 13 g/10 min | | 76 | 76 | 76.5 | 76.5 |
| Color concentrate | | | | | |
| 85 parts of acetal copolymer MFI190/2 = 9 g/10 min 15 parts of Acetogen Black HV | | 20 | 20 | 20 | 20 |
| Methyl methacrylate-styrene copolymer Beads, mean particle size 200 μm | | 3 | — | — | — |
| Polymethyl methacrylate Ground particles, mean particle size 150 μm | | — | 3 | 3 | 3 |
| Silicon dioxide mean particle size 4 μm | | 1 | 1 | 0.5 | 0.1 |
| Properties | Unit | | | | |
| Melt flow index | | | | | |
| MFI 190/2 | g/10 min | 10.5 | — | — | — |
| Yield stress | N/mm² | 6.5 | — | — | — |
| Elongation at yield stress | % | 6.5 | — | — | — |
| Elongation at break | % | 9 | — | — | — |
| Modulus of elasticity in bending | N/mm² | 3050 | — | — | — |
| Ball-impression hardness | N/mm² | — | — | — | — |
| Izod notched impact strength | mJ/mm² | 3.8 | — | — | — |
| Gloss (60° Gardner) | — | 43 | 38 | 40 | 44 |
| Surface quality | — | smooth | smooth | smooth | smooth |

| Examples | | 16C | 17C | 18C | 19C |
|---|---|---|---|---|---|
| Acetal copolymer MFI 190/2 = 13 g/10 min | | 75 | 70 | 67 | 77 |
| Color concentrate | | | | | |
| 85 parts of acetal copolymer MFI190/2 = 9 g/10 min 15 parts of Acetogen Black HV | | 20 | 20 | 20 | 20 |
| Aliphatic polyester-urethane | | 5 | 10 | — | — |
| Methyl methacrylate-butadiene-styrene graft polymer mean particle size 13 μm | | — | — | 13 | — |
| Polymethyl methacrylate mean particle size 20 μm | | — | — | — | 3 |
| Properties | Unit | | | | |
| Melt flow index | | | | | |
| MFI 190/2 | g/10 min | 12.4 | 10 | 7 | — |
| Yield stress | N/mm² | 57 | 50 | 43 | — |
| Elongation at yield stress | % | 10 | 11 | 9 | — |
| Elongation at break | % | 28 | 55 | 38 | — |
| Modulus of elasticity in bending | N/mm² | 2650 | 2200 | 2200 | — |
| Ball-impression hardness | N/mm² | — | 115 | 105 | — |
| Izod notched impact strength | mJ/mm² | 5.5 | 6.5 | 10.5 | — |
| Gloss (60° Gardner) | — | 70 | 50 | 66 | 71 |
| Surface quality | — | smooth | smooth | smooth | smooth |

*MFI 190/2.16

We claim:

1. A moldable polyoxymethylene composition comprising:

A) polyoxymethylene and

B) 0.5 to 10% by weight of acrylic polymer, the mean particle size of the acrylic polymer being greater than 50 but less than 600 μm; said particle size and any additional ingredients in said moldable polyoxymethylene composition being selected to provide a moldable polyoxymethylene composition which, when molded, produces a molded article having substantially the same surface smoothness, elongation at break, modulus of elasticity in bending, and ball-impression hardness of an essentially pure polyoxymethylene molded article, said elongation at break and said modulus being determined according to DIN 53457 and said ball-impression hardness being determined according to DIN 53456, said molded polymeric article having less than 60° Gardner gloss as compared to said essentially pure polyoxymethylene molded article.

2. A composition as claimed in claim 1, wherein the acrylic polymer is at least one polymethyl, polyethyl or polybutyl acrylate or methacrylate or is a copolymer of methyl acrylate or methacrylate and styrene.

3. A composition as claimed in claim 1, wherein the polyoxymethylene comprises at least 50% of recurring —CH$_2$O— units.

4. A composition as claimed in claim 1, which additionally contains from 0.1 to 2% by weight of silicon dioxide having a particle size of from 3 to 15 μm.

5. A composition as claimed in claim 1, wherein said composition contains a minor amount of one or more of the following additives: a stabilizer, a formaldehyde scavenger, an antioxidant, a lubricant, a dye, a pigment, a carbon black, an inorganic filler, or a polymer, in addition to said components A and B, containing repeating urethane, vinyl, ethylene, styrene, butadiene, or acrylonitrile units or combinations thereof.

6. A composition as claimed in claim 1, wherein the acrylic polymer is a copolymer.

7. A composition as claimed in claim 1, wherein the acrylic polymer is a copolymer of methyl methacrylate and styrene.

8. Moldings having a matt surface produced from a polyoxymethylene composition as claimed in claim 1.

9. Moldings as claimed in claim 8 in the form of injection moldings, the particle size of the acrylic polymer of said component B being in the range of from 20–300 μm.

10. A molded polymeric article having substantially the same surface smoothness, elongation at break, modulus of elasticity in bending, and ball-impression hardness of an essentially pure polyoxymethylene molded article, said elongation at break and said modulus being determined according to DIN 53457 and said ball-impression hardness being determined according to DIN 53456, said molded polymeric article having less 60° Gardner gloss as compared to said essentially pure polyoxymethylene molded article, the polymeric portion of said molded polymeric articles consisting essentially of:
A. a polyoxymethylene polymer, and
B. 0.5 to 10% by weight of acrylic polymer, based on the weight of said molded polymeric article, the means particle size of the acrylic polymer being greater than 50 but less than 600 μm.

11. A molded article as claimed in claim 10, wherein said article consists essentially of:
about 1 to about 5% by weight of acrylic polymer,
more than 84% by weight of polyoxymethylene polymer,
from 0 to about 2% by weight of silicon dioxide having a mean agglomerate size in the range of 3 to 15 μm, and
optionally, one or more of the following additives: a stabilizer, a formaldehyde scavenger, an antioxidant, a lubricant, a dye, a pigment, a carbon black, an inorganic filler, or a polymer, in addition to said components A and B containing repeating urethane, vinyl, ethylene, styrene, butadiene, or acrylonitrile units or combinations thereof.

12. A molded article as claimed in claim 10, wherein said article has been prepared by injection molding.

* * * * *